United States Patent
Goto et al.

(10) Patent No.: US 11,074,479 B2
(45) Date of Patent: Jul. 27, 2021

(54) LEARNING OF DETECTION MODEL USING LOSS FUNCTION

(71) Applicant: International Business Machines Corporation, Armonk, NY (US)

(72) Inventors: Takuya Goto, Tokyo (JP); Hiroki Nakano, Shiga-ken (JP); Masaharu Sakamoto, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 16/367,365

(22) Filed: Mar. 28, 2019

(65) Prior Publication Data

US 2020/0311479 A1    Oct. 1, 2020

(51) Int. Cl.
*G06K 9/62* (2006.01)
*G06K 9/32* (2006.01)

(52) U.S. Cl.
CPC ......... *G06K 9/6262* (2013.01); *G06K 9/3233* (2013.01)

(58) Field of Classification Search
CPC .......................... G06K 9/6262; G06K 9/3233
See application file for complete search history.

(56) References Cited

U.S. PATENT DOCUMENTS

| | | | |
|---|---|---|---|
| 8,879,813 B1 * | 11/2014 | Solanki | A61B 3/14 382/128 |
| 9,968,257 B1 * | 5/2018 | Burt | A61B 5/0035 |
| 10,719,936 B2 * | 7/2020 | Paschalakis | G06K 9/6257 |
| 2008/0075343 A1 * | 3/2008 | John | A61B 6/541 382/131 |
| 2010/0067760 A1 * | 3/2010 | Zhang | G06T 7/11 382/130 |
| 2017/0103532 A1 | 4/2017 | Ghesu | |
| 2017/0287137 A1 * | 10/2017 | Lin | G06N 3/08 |
| 2018/0129906 A1 | 5/2018 | Habibian | |

(Continued)

FOREIGN PATENT DOCUMENTS

| CN | 107301640 A | 10/2017 |
|---|---|---|
| CN | 108898188 A | 11/2018 |

(Continued)

OTHER PUBLICATIONS

Çiçek, Özgün, et al. "3D U-Net: learning dense volumetric segmentation from sparse annotation." International conference on medical image computing and computer-assisted intervention. Springer, Cham, 2016. (Year: 2016).*

(Continued)

*Primary Examiner* — Tsung Yin Tsai
(74) *Attorney, Agent, or Firm* — William H. Hartwell; Isaac J. Gooshaw

(57) ABSTRACT

There is a desire to accurately learn a detection model. Provided is a computer-implemented method including acquiring an input image; acquiring an annotated image designating a region of interest in the input image; inputting the input image to a detection model that generates an output image showing a target region from the input image; calculating an error between the output image and the annotated image, using a loss function that weights an error inside the region of interest more heavily than an error outside the region of interest; and updating the detection model in a manner to reduce the error.

22 Claims, 8 Drawing Sheets

(56) References Cited

U.S. PATENT DOCUMENTS

| | | | |
|---|---|---|---|
| 2018/0307897 A1 | 10/2018 | El-Khamy | |
| 2019/0213779 A1* | 7/2019 | Sutton | G06T 15/08 |
| 2019/0384303 A1* | 12/2019 | Muller | G06K 9/00791 |
| 2020/0234025 A1* | 7/2020 | Cohen | G06K 9/0014 |
| 2020/0311483 A1* | 10/2020 | Goto | G06N 3/08 |

FOREIGN PATENT DOCUMENTS

| | | | |
|---|---|---|---|
| CN | 109035197 A | 12/2018 | |
| CN | 109145939 A | 1/2019 | |
| JP | 06117836 A | 4/1994 | |
| JP | 06180139 A | 6/1994 | |
| JP | 06309457 A | 11/1994 | |
| JP | 07175776 A | 7/1995 | |
| JP | 2006031440 A | 2/2006 | |
| JP | 2008217246 A | 9/2008 | |
| JP | 2018068863 A | 5/2018 | |
| JP | 2018206321 A | 12/2018 | |
| WO | 2006120724 A1 | 11/2006 | |
| WO | 2018009405 A1 | 1/2018 | |
| WO | 2020194111 A1 | 10/2020 | |

OTHER PUBLICATIONS

Matsukawa, Tetsu, and Einoshin Suzuki. "Person re-identification using CNN features learned from combination of attributes." 2016 23rd international conference on pattern recognition (ICPR). IEEE, 2016. (Year: 2016).*

Goto et al., "Learning of Detection Model Using Loss Function", U.S. Appl. No. 16/507,625, filed Jul. 10, 2019, pp. 1-36.

IBM Appendix P, "List of IBM Patents or Patent Applications to be Treated as Related", Dated Jul. 10, 2019, 2 pages.

Bjorck et al., "Understanding Batch Normalization", 32nd Conference on Neural Information Processing Systems (NIPS 2018), Montréal, Canada, 12 pages.

Gibson et al., "NiftyNet: A Deep-Learning Platform for Medical Imaging", arXiv:1709.03485v2 [cs.CV] Oct. 16, 2017, 26 pages.

Ronneberger et al., "U-Net: Convolutional Networks for Biomedical Image Segmentation", arXiv:1505.04597v1 [cs.CV] May 18, 2015, 8 pages.

Nguyen et al., "U-Net for MAV-based Penstock Inspection: An Investigation of Focal Loss in Multi-Class Segmentation for Corrosion Identification", arXiv: 1809.06576v1 [cs.CV] Sep. 18, 2018, 9 pages.

Saito et al. "Deep-learning-based quality filtering of mechanically exfoliated 2D crystals", npj Computational Materials 5.1 (2019), pp. 1-6, (Year: 2019).

Yang et al., "Automatic Segmentation of Kidney and Renal Tumor in CT Images Based on 3D Fully Convolutional Neural Network with Pyramid Pooling Module", HAL Id: Hal-02036719, submitted on May 2, 2019, 7 pages.

International Search Report and Written Opinion, International Application No. PCT/IB2020/052309, International Filing Date Mar. 13, 2020, 11 pages.

* cited by examiner

LEARNING OF DETECTION MODEL USING LOSS FUNCTION

BACKGROUND

The present invention relates to learning a detection model using a loss function.

SUMMARY

According to an embodiment of the present invention, provided is a computer-implemented method comprising acquiring an input image; acquiring an annotated image designating a region of interest in the input image; inputting the input image to a detection model that generates an output image showing a target region from the input image; calculating an error between the output image and the annotated image, using a loss function that weights an error inside the region of interest more heavily than an error outside the region of interest; and updating the detection model in a manner to reduce the error.

Weighted cross entropy may be used as the loss function. In this way, the errors can be weighted using weighted cross entropy.

The detection model may include, between an input and an output, one or more convolution layers, one or more pooling layers, one or more deconvolution layers, and one or more batch normalization layers. In this way, in some embodiments, the detection model hastens the of convergence of learning, and restricts over-learning.

The computer-implemented method may further comprise acquiring at least one coordinate in the input image; and specifying the region of interest according to the, at least, one coordinate. In this way, it is possible to roughly specify the region of interest from at least one coordinate.

According to another embodiment of the present invention, provided is an apparatus comprising a processor or a programmable circuitry; and one or more computer readable mediums collectively including instructions that, in response to being executed by the processor or the programmable circuitry, cause the processor or the programmable circuitry to acquire an input image; acquire an annotated image designating a region of interest in the input image; input the input image to a detection model that generates an output image showing a target region from the input image; calculate an error between the output image and the annotated image, using a loss function that weights an error inside the region of interest more heavily than an error outside the region of interest; and update the detection model in a manner to reduce the error. In this way, the processor or programmable circuitry acquires an input image and accurately learns the detection model.

According to another embodiment of the present invention, provided is a computer program product including one or more computer readable storage mediums collectively storing program instructions that are executable by a processor or programmable circuitry to cause the processor or the programmable circuitry to perform operations comprising acquiring an input image; acquiring an annotated image designating a region of interest in the input image; inputting the input image to a detection model that generates an output image showing a target region from the input image; calculating an error between the output image and the annotated image, using a loss function that weights an error inside the region of interest designated by the annotated image more heavily than an error outside the designated region of interest; and updating the detection model in a manner to reduce the error. In this way, it is possible to increase the accuracy associated with the machine learning of the detection model.

According to another embodiment of the present invention, provided is an apparatus comprising a processor or a programmable circuitry; and one or more computer readable mediums collectively including instructions that, in response to being executed by the processor or the programmable circuitry, cause the processor or the programmable circuitry to realize a neural network for generating an output image showing a target region from an input image, wherein the neural network includes, between an input and an output, a plurality of convolution layers, a plurality of pooling layers, a plurality of deconvolution layers, and a plurality of batch normalization layers, and the plurality of batch normalization layers are arranged, respectively, after every predetermined number of layers, in at least one of a first path including some of the plurality of convolution layers and the plurality of pooling layers and a second path including the rest of the plurality of convolution layers and the plurality of deconvolution layers.

According to another embodiment of the present invention, provided is a computer program product including one or more computer readable storage mediums collectively storing program instructions that are executable by a processor or programmable circuitry to cause the processor or the programmable circuitry to perform operations comprising realizing a neural network for generating an output image showing a target region from an input image, wherein the neural network includes, between an input and an output, a plurality of convolution layers, a plurality of pooling layers, a plurality of deconvolution layers, and a plurality of batch normalization layers, and the plurality of batch normalization layers are arranged, respectively, after every predetermined number of layers in at least one of a first path including some of the plurality of convolution layers and the plurality of pooling layers and a second path including the rest of the plurality of convolution layers and the plurality of deconvolution layers. In this way, in some embodiments, the detection model hastens the of convergence of learning, and restricts over-learning.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DETAILED DESCRIPTION

Hereinafter, some embodiments of the present invention will be described. The embodiments do not limit the invention according to the claims, and all the combinations of the features described in the embodiments can include but are not limited to the embodiments provided by features disclosed in the specification.

Figure 1:
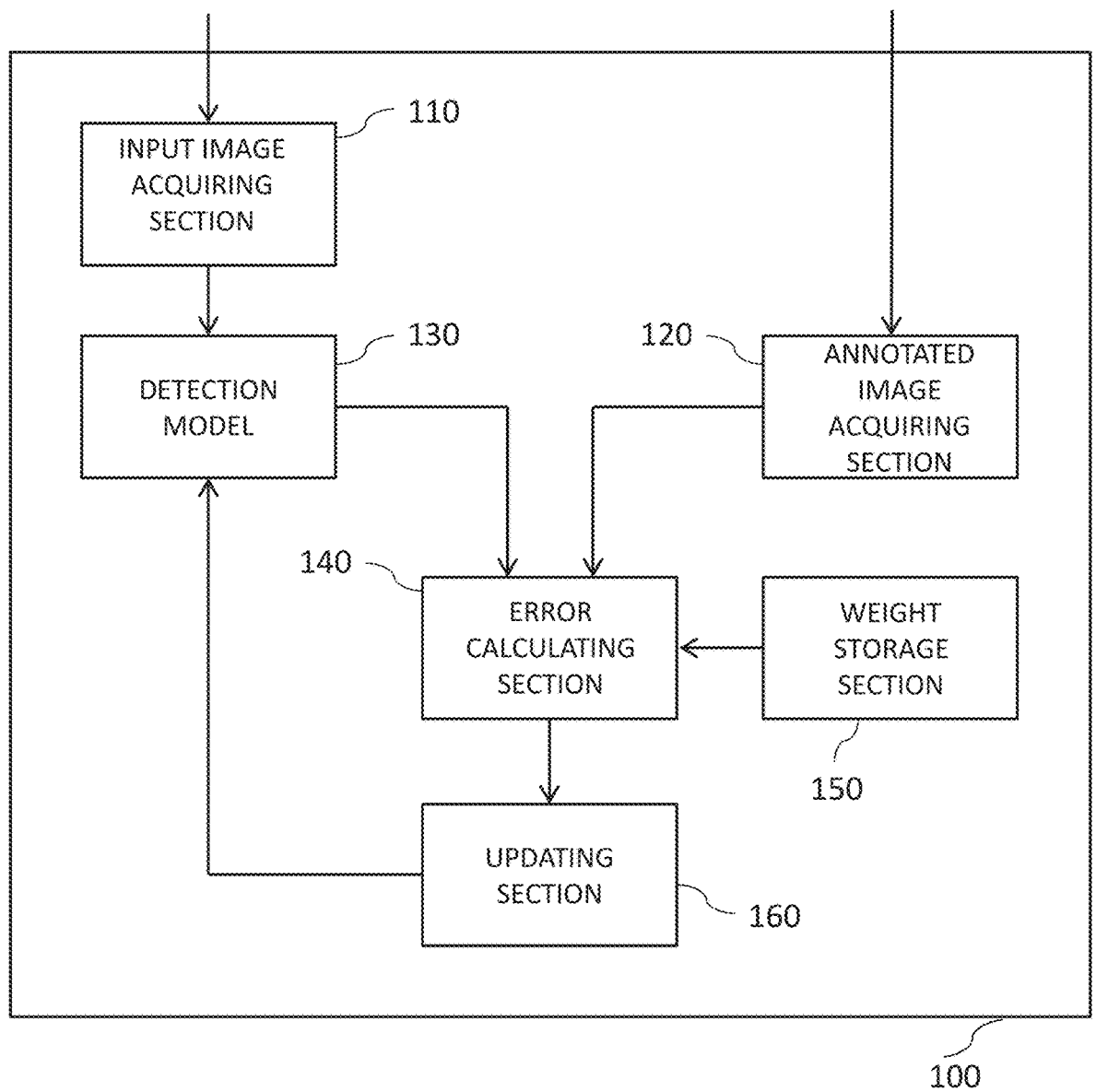
FIG. 1 is a functional block diagram illustrating a computing environment, in which a system for learning a detection model utilizes a loss function, in accordance with an exemplary embodiment of the present invention.

FIG. 1 is a functional block diagram of apparatus 100 according to the present embodiment. The apparatus 100 may be a computer such as a PC (Personal Computer), a tablet computer, a smartphone, a work station, a server computer, or a general purpose computer, a computer system in which a plurality of computers are connected, or any programmable electronic device or combination of programmable electronic devices capable of executing a system for learning a detection model utilizes a loss function. Such a computer system is also a computer, in a broad definition. Furthermore, the apparatus 100 may be implemented by one or more virtual computer environments capable of being executed in a computer system. Instead, the apparatus 100 may be a specialized computer designed to update a detection model or may contain specialized hardware utilized by specialized circuitry. Furthermore, if the apparatus 100 is capable of connecting to the Internet, the apparatus 100 may be utilized in cloud computing.

The apparatus 100 uses a loss function to calculate the error between an annotated image and an output image generated by inputting an input image to a detection model and updates the detection model in a manner to decrease this error. In doing so, the apparatus 100 according to the present embodiment learns the detection model by weighting errors in a region of interest (ROI) more heavily than errors outside the region of interest, as the loss function. In the present embodiment, a case in which the apparatus 100 learns a detection model that detects disease such as a lung tumor from an X-ray image of an animal is shown, as an example. However, the detection model includes this example, but is not limited in scope to features recognizing tissue structures, such as, for example, tumors in animals. The apparatus 100 may learn a detection model that detects various regions from various images. The apparatus 100 includes an input image acquiring section 110, an annotated image acquiring section 120, a detection model 130, an error calculating section 140, a weight storage section 150, and an updating section 160.

The input image acquiring section 110 retrieves a plurality of input images, which, for the purposes of clarity in understanding, are considered to be "original" images by certain embodiments. For example, in one embodiment, the input image acquiring section 110 retrieves a plurality of X-ray images of an animal. The input image acquiring section 110 communicates with the detection model 130 such that detection model 130 is provided with the plurality of acquired input images.

The annotated image acquiring section 120 retrieves an annotated image designating a region of interest in the input image, for each of the plurality of input images. For example, annotated image acquiring section 120 may retrieve each annotated image in which a label, indicating that a region is different from other regions, is attached to the region of interest in the input images. The annotated image acquiring section 120 communicates to error calculating section 140 the acquired annotated images.

The detection model 130 receives the plurality of input images retrieved from input image acquiring section 110 and generates each output image showing a target region from these input images. In the present embodiment, a multilayer neural network, which is described further below, is used as the algorithm of detection model 130. However, detection model 130 is not limited to the present embodiment. Instead, in addition to the model described below, a neural network such as CNN, FCN, SegNet, and U-Net, or any algorithm capable of detecting a target region such as a support vector machine (SVM) and a determination tree, may be used as detection model 130. The detection model 130 communicates to error calculating section 140 the generated output images.

The error calculating section 140 calculates the respective errors between the output images supplied from the detection model 130 and the annotated images supplied from the annotated image acquiring section 120, using the loss function. When doing this, the error calculating section 140 uses weighted cross entropy as the loss function, to weight the errors inside the region of interest more heavily than the errors outside the region of interest. In other words, as an example, the error calculating section 140 weighs the errors within the region designated as a lung tumor by a doctor than the errors outside this region. This is described in detail further below.

The weight storage section 150 stores, in advance, weights and supplies these weights to the error calculating section 140. Error calculating section 140 leverages the weights with a weighted cross entropy to calculate the errors.

The error calculating section 140 applies the weights supplied from the weight storage section 150 to the weighted cross entropy, to calculate the errors between the output images and the annotated images and supplies these errors to the updating section 160.

The updating section 160 updates the detection model 130 in a manner to reduce the errors supplied from the error calculating section 140. For example, the updating section 160 updates each parameter of the detection model in a manner to minimize the errors, using an error backward propagation technique. One having ordinary skill in the art would recognize that the error backward propagation technique itself is widely accepted as an algorithm used when learning a detection model.

Figure 2:
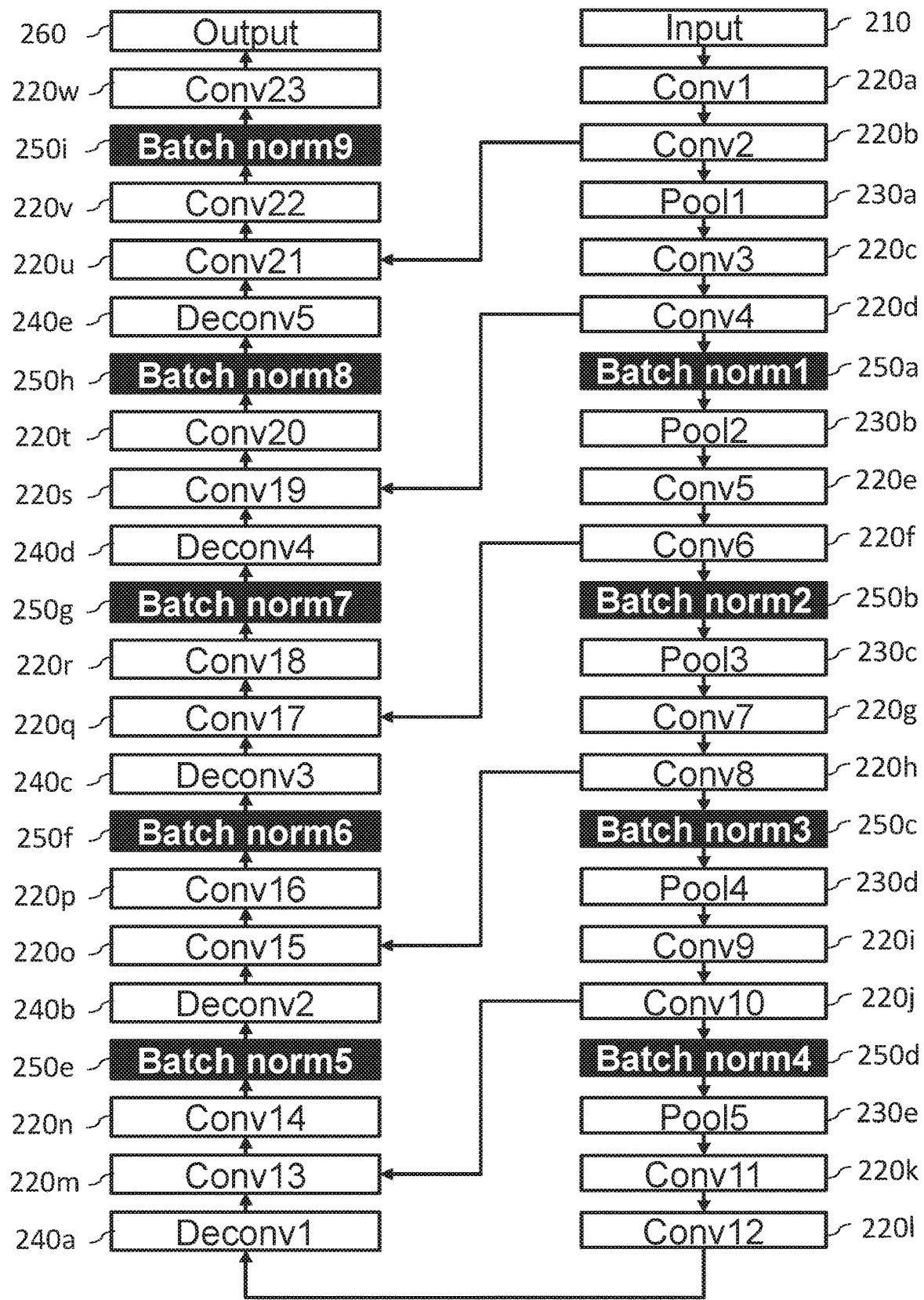
FIG. 2 illustrates an exemplary network of the detection model within the environment of FIG. 1, in accordance with at least one embodiment of the present invention.

FIG. 2 shows an exemplary network of the detection model 130 according to the present embodiment. As an example, the detection model 130 includes, between an input and an output, one or more convolution layers, one or more pooling layers, one or more deconvolution layers, and one or more batch normalization layers. In the present drawing, as an example, the detection model 130 includes, between an input layer 210 and an output layer 260, a plurality of convolution layers 220a to 220w (referred to collectively as "convolution layers 220"), a plurality of pooling layers 230a to 230e (referred to collectively as "pooling layers 230"), a plurality of deconvolution layers 240a to 240e (referred to collectively as "deconvolution layers 240"), and a plurality of batch normalization layers 250a to 250i (referred to collectively as "batch normalization layers 250").

The convolution layers 220 each output a feature map by performing a convolution operation applied to the input image, while sliding a kernel (filter) having a predetermined magnitude.

The pooling layers 230 each compress and down-sample information, in order to deform the input image into a shape that is easier to handle. In this case, each pooling layer 230 may use max pooling to select and compress a maximum value of each range or may use average pooling to calculate and compress the average value of each range, for example.

The deconvolution layers 240 each expand the size by adding blanks around and/or between each element in the feature map input thereto, and then perform the deconvolution operation applied while sliding a kernel (filter) having a predetermined magnitude.

The batch normalization layers 250 each replace the output of each unit with a new value normalized for each mini batch. In other words, each batch normalization layer 250 performs normalization such that the elements of each of a plurality of images have a normalized distribution.

The detection model 130 according to the present embodiment has a first path that is an encoding path including the plurality of convolution layers 220a to 220l and the plurality of pooling layers 230a to 230e and a second path that is a decoding path including the plurality of convoluting layers 220m to 220w and the plurality of deconvolution layers 240a to 240e, for example. The encoding path and the decoding path each connect feature maps having the same dimensions.

Furthermore, in the detection model 130 according to the present embodiment, the plurality of batch normalization layers 250 are respectively arranged every predetermined number of layers within at least one of the first path including some of the plurality of convolution layers 220 and the plurality of pooling layers 230 and the second path including the rest of the plurality of convolution layers 220 and the plurality of deconvolution layers 240.

As an example, the plurality of batch normalization layers 250a to 250d are respectively arranged at every predetermined number of layers in the encoding path, and the plurality of batch normalization layers 250e to 250i are respectively arranged every predetermined number of layers in the decoding path. More specifically, as shown in the present drawing, in the encoding path, the plurality of batch normalization layers 250a to 250d are respectively arranged after the convolution layers 220d, 220f, 220h, and 220j that are connected to the decoding path. Furthermore, in the decoding path, the plurality of batch normalization layers 250e to 250h are respectively arranged after the convolution layers 220n, 220p, 220r, 220t, and 220v.

In this way, according to the detection model 130 of the present embodiment, at least one batch normalization layer 250 is arranged in at least one of the encoding path and the decoding path, and therefore it is possible to prevent large change of the internal variable distribution (internal covariate shift) and hasten the convergence of the learning, and also to restrict over-learning. Furthermore, by using such a detection model 130, the apparatus 100 according to the present embodiment can more efficiently learn the detection model 130 when learning correct label classification from labels containing errors.

Figure 3:
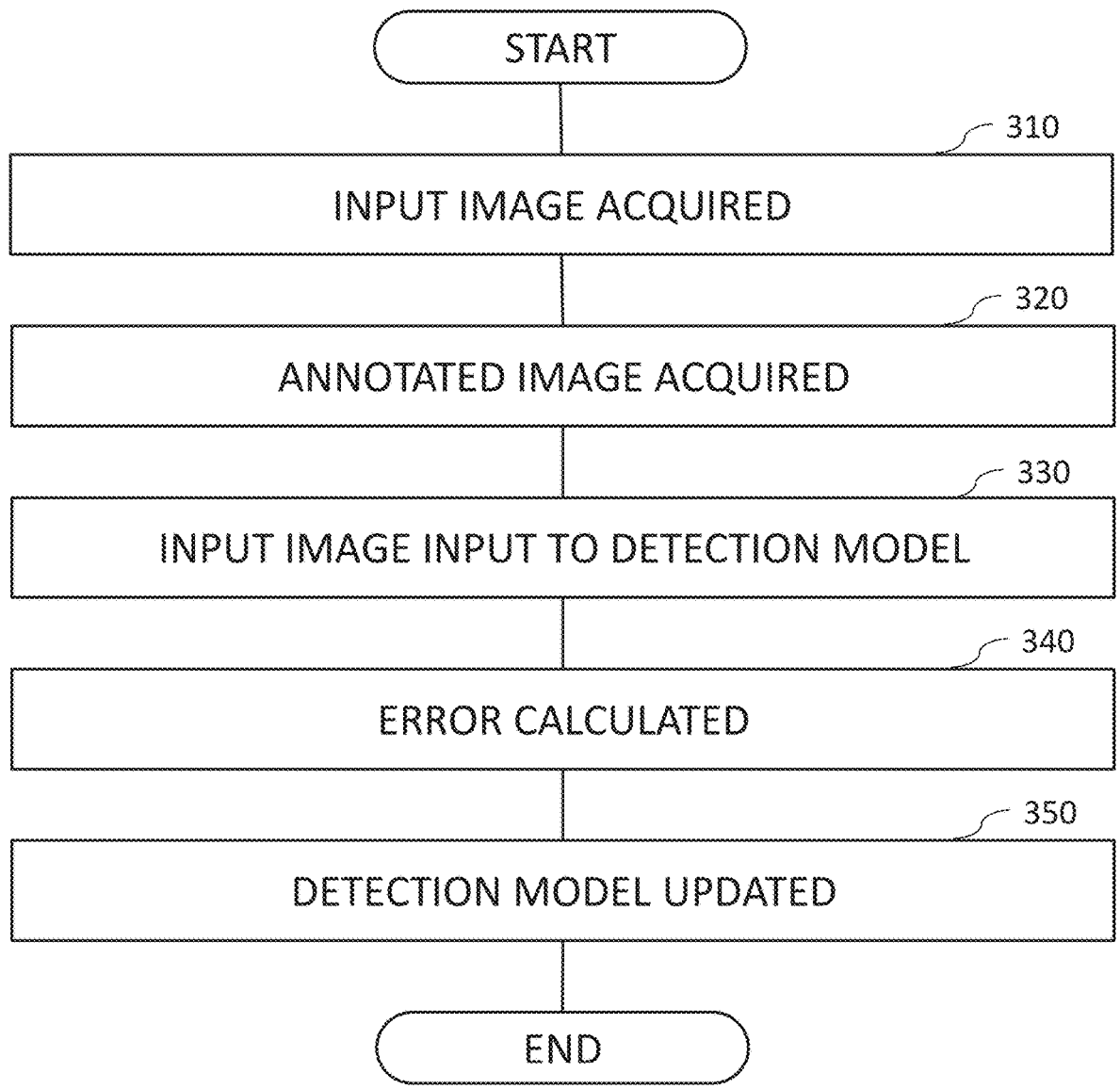
FIG. 3 illustrates operational processes of a detection model executing on a computing device within the environment of FIG. 1, in accordance with at least on embodiment of the present invention.

FIG. 3 illustrates operational processes by which the apparatus 100 learns the detection model 130, according to the present embodiment.

At step 310, the apparatus 100 acquires a plurality of input images. For example, the input image acquiring section 110 acquires a plurality of X-ray images of an animal. If the sizes of the images are different from each other, the input image acquiring section 110 may acquire images that have each undergone preprocessing (e.g. pixel value normalization, cropping to a predetermined shape, and resizing to a predetermined size) as the input images. At this time, the input image acquiring section 110 may acquire the plurality of input images via the Internet, via user input, or via a memory device or the like capable of storing data, for example. The input image acquiring section 110 supplies the detection model 130 with the plurality of acquired input images.

At step 320, the apparatus 100 acquires an annotated image designating the region of interest in the input image, for each of the plurality of input images. For example, the annotated image acquiring section 120 acquires each annotated image in which pixels inside a region designated as a lung tumor by a doctor, for example, are labeled with a class $c=1$ and the pixels outside of this region are labeled with a class $c=0$. In the above description, an example is shown in which each pixel is labeled according to two classes (e.g. $c=0$ and $c=1$) based on whether the pixel is inside or outside of the region designated as a lung tumor, but the present embodiment is not limited to this. For example, the annotated image acquiring section 120 may acquire each annotated image in which pixels inside a lung region and also inside a lung tumor region are labeled with a class $c=2$, pixels inside a lung region but outside of a lung tumor region are labeled with a class $c=1$, and pixels outside the lung region and outside the lung tumor region are labeled with a class $c=0$. In other words, the annotated image acquiring section 120 may acquire each annotated image labeled according to three or more classes (e.g. $c=0$, $c=1$, and $c=2$.) At this time, the annotated image acquiring section 120 may acquire each annotated image via a network, via user input, or via a memory device or the like capable of storing data. The annotated image acquiring section 120 supplies the error calculating section 140 with the acquired annotated images.

At step 330, the apparatus 100 inputs each of the plurality of input images acquired at step 310 into the detection model 130 that generates the output images of the target region from the input images. For example, for each of the plurality of input images, the detection model 130 generates an output image in which the pixels within the region predicted to be the target region, i.e. the lung tumor region, in the input image are labeled with the class $c=1$ and the pixels outside this region are labeled with the class $c=0$. The detection model 130 then supplies the error calculating section 140 with each of the generated output images. In the above description, an example is shown in which the apparatus 100 generates the output images after acquiring the annotated images, but the apparatus 100 is not limited to this. The apparatus 100 may acquire the annotated images after generating the output images. In other words, step 320 may be performed after step 330.

At step 340, the apparatus 100 calculates the respective errors between the output images acquired at step 330 and the annotated images acquired at step 320, using the loss function. At this time, the error calculating section 140 uses cross entropy as the loss function. Generally, cross entropy is a scale defined between two probability distributions, which are a probability distribution and a reference fixed probability distribution, has a minimum value when the probability distribution and the reference fixed distribution are the same, and has a value that is larger the more that the probability distribution differs from the reference fixed distribution. Here, when calculating the error between an output image and an annotated image, if this cross entropy is used without weighting any of the pixels in the input image, the error is strongly affected by pixel groups with a wide area. When this happens, if there is an error contained in the annotated image, for example, there are cases where the detection model for detecting the target region cannot be learned accurately, even if the detection model is updated to minimize this error.

Therefore, in the present embodiment, the loss function used by the error calculating section 140 to calculate the error weights errors inside the region of interest more heavily than errors outside the region of interest. At this time, the error calculating section 140 may use weighted cross entropy as the loss function. For example, the weight storage section 150 stores in advance the weights to be applied to this weighted cross entropy, and supplies the error calculating section 140 with these weights. The error calculating section 140 applies the weights supplied from the weight storage section 150 to the weighted cross entropy, to calculate the error between the output image and the annotated image. Here, when weighting the errors inside the region of interest more heavily than the errors outside the region of interest, in the weighted cross entropy, the weight in the target region may be set to be a larger value than the weight outside the target region. Instead, in the weighted cross entropy, the weight inside the region of interest may be set to be a larger value than the weight outside the region of interest. This is explained using mathematical expressions.

The error calculating section 140 uses the weighted cross entropy shown by the following expression as the loss function, for example. It should be noted that X is the collection of all pixels "i" in the input image, C is the collection of all classes c, $W_c$ is the weight of a class c, $p_i^c$ is the value of the class c at the pixel "i" in the annotated image, and $q_i^c$ is the value of the class c at the pixel "i" in the output image.

$$\mathcal{L} = \sum_{i \in X} \sum_{c \in C} w_c p_i^c \log q_i^c \qquad \text{Expression 1}$$

Here, an example is described in which the annotated image acquiring section 120 acquires the annotated image in which the pixels inside the region of interest (ROI) designated as a lung tumor by a doctor are labeled as class c=1 and the pixels outside the region of interest are labeled as class c=0, and the detection model 130 generates an output image in which the class c=1 is given to pixels within the target region that is predicted to be the lung tumor region in the input image and the class c=0 is given to pixels outside of the target region.

In this case, Expression 1 is expanded into the expression shown below. Specifically, the cross entropy is expanded as the sum of four components, which are (1) a component in which the pixels inside the region of interest are labeled with c=1 and are predicted to be inside the target region, (2) a component in which the pixels inside the region of interest are labeled with c=0 and are predicted to be outside the target region, (3) a component in which the pixels outside the region of interest are labeled with c=1 and are predicted to be inside the target region, and (4) a component in which the pixels outside the region of interest are labeled with c=0 and are predicted to be outside the target region.

$$\mathcal{L} = w_c p_{i=ROIin}^{c=1} \log q_{i=ROIin}^{c=1} + w_c p_{i=ROIin}^{c=0} \log q_{i=ROIin}^{c=0} + \\ w_c p_{i=ROIout}^{c=1} \log q_{i=ROIout}^{c=1} + w_c p_{i=ROIout}^{c=0} \log q_{i=ROIout}^{c=0} \qquad \text{Expression 2}$$

However, in the case described above, the probability of a pixel inside the region of interest being labeled with c=0 is 0, and therefore the second term component in Expression 2 is 0. Similarly, the probability of a pixel outside the region of interest being labeled with c=1 is 0, and therefore the third term component in Expression 2 is 0. The probability of a pixel inside the region of interest being labeled with c=1 and the probability of a pixel outside the region of interest being labeled with c=0 are both 1, and therefore Expression 2 can be shows as the expression below. Specifically, the cross entropy is shown as the sum of two components, which are a component in which the pixels inside the region of interest are predicted to be inside the target region and a component in which the pixels outside the region of interest are predicted to be outside the target region.

$$\mathcal{L} = w_c \log q_{i=ROIin}^{c=1} + w_c \log q_{i=ROIout}^{c=0} \qquad \text{Expression 3:}$$

In the present embodiment, the loss function weights the errors inside the region of interest more heavily than the errors outside the region of interest. In other words, in Expression 3, the weight Wc of the first term component is set to be a larger value than the weight Wc of the second term component. Here, in the weighted cross entropy, by setting the weight inside the target region to be a larger value than the weight outside the target region, the errors inside the region of interest may be weighted more heavily than the errors outside the region of interest. In other words, by setting the weights of the first term component and the third term component in Expression 2 to be larger values than the weights of the second term component and the fourth term component in Expression 2, the weight of the first component in Expression 3 may be set to be a larger value than the weight of the second component in Expression 3. Instead, in the weighted cross entropy, by setting the weight inside the region of interest to be a larger value than the weight outside the region of interest, the error inside the region of interest may be weighted more heavily than the error outside the region of interest. In other words, by setting the weights of the first term component and the second term component in Expression 2 to be larger values than the weights of the third term component and the fourth term component in Expression 2, the weight of the first term component in Expression 3 may be set to be a larger value than the weight of the second term component in Expression 3. The error calculating section 140 then supplies the updating section 160 with the error between the output image and the annotated image calculated in this manner.

At step 350, the apparatus 100 updates the detection model 130 in a manner to reduce the error calculated at step 340. For example, the updating section 160 uses the error backward propagation technique to update each parameter of the detection model 130 in a manner to minimize this error, and then ends the process.

The apparatus 100 can repeatedly perform the processes from step 330 to step 350, in accordance with various learning methods such as batch learning, mini batch learning, and online learning.

Figure 4:
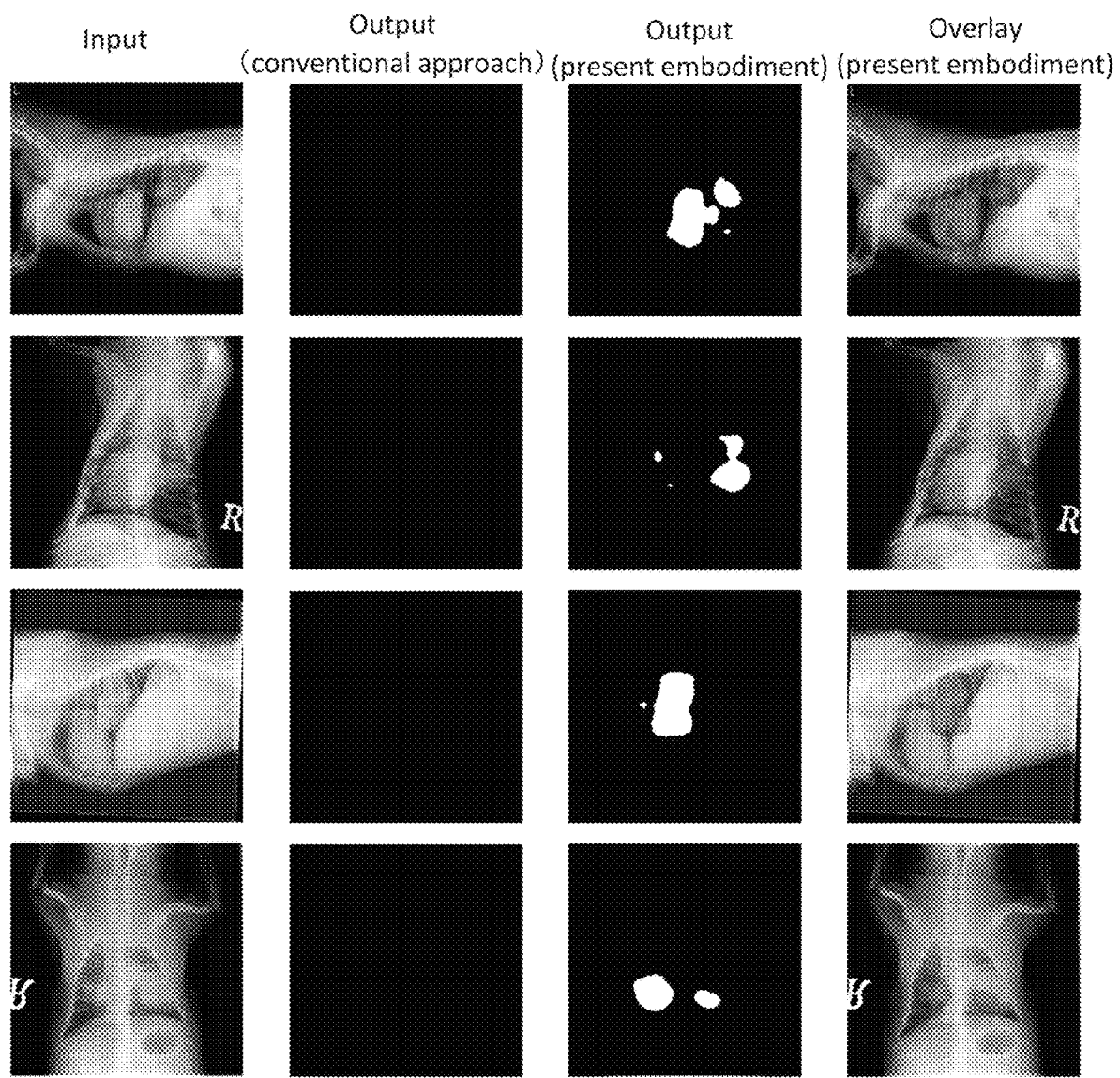
FIG. 4 shows an example of comparisons between output images according to the present embodiment and output images obtained through the conventional approach.

FIG. 4 shows an example of comparisons between output images according to the present embodiment and output images obtained through the conventional approach. In the present drawing, input images, output images obtained through the conventional approach, output images obtained according to the present embodiment, and overlay images in which the output images obtained according to the present embodiment are overlaid on the input images are shown in the stated order, from left to right. As shown in the present drawing, with the detection model according to the conventional approach, it was impossible to divide the input images into classes and make predictions between the lung tumor regions and other region. In contrast to this, with the detection model 130 learned by the apparatus 100 according to the present embodiment, it was possible to obtain output in which lung tumor regions (regions shown in white in the drawing) and the other regions (regions shown in black in the drawing) are divided according to class. When viewing the images in which this output is overlaid on the input images, the target regions predicted by the detection model 130 mostly match the actual lung tumor regions, and it is possible to confirm the reliability of the detection model 130.

In this way, according to the apparatus 100 of the present embodiment, when using the loss function to calculate the error between an output image and an annotated image, the loss function weights the errors inside the region of interest more heavily than the errors outside the region of interest. Due to this, the apparatus 100 can (i) enhance the effect caused by the pixels inside the region of interest and (ii) calculate the error between the output image and the annotated image. The detection model is then updated in a manner to minimize the error calculated in this way, and therefore, even if errors are contained in the annotated image, for example, the apparatus 100 can accurately learn the detection model 130 for detecting the target region. In other words, the apparatus 100 can learn the detection model 130 by weak supervised learning that learns the correct label classification from labels including errors.

Figure 5:
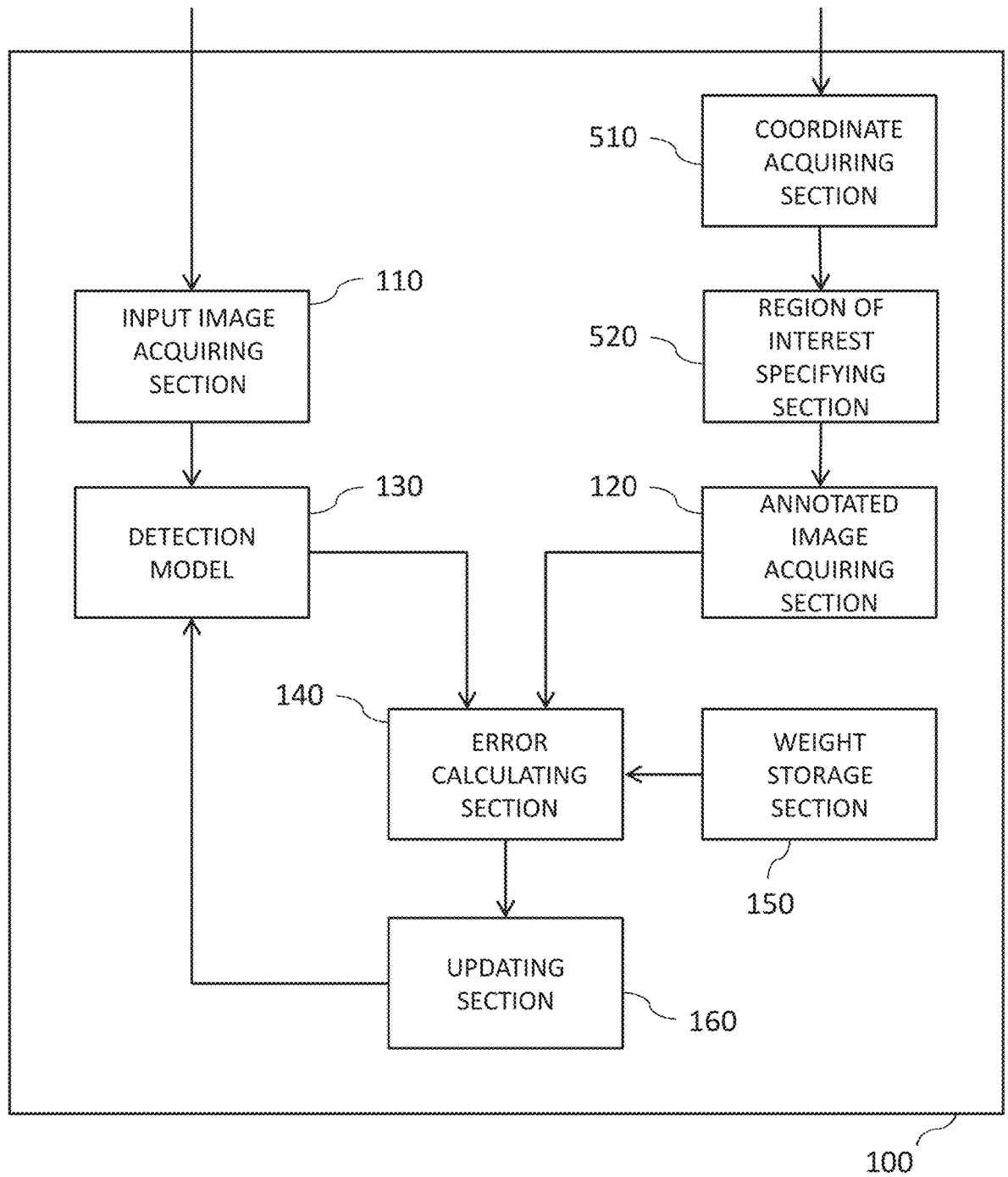
FIG. 5 illustrates a functional block diagram illustrating a computing environment, in which a modification to the system for learning a detection model utilizing a loss function, in accordance with at least on embodiment of the present invention.

FIG. 5 illustrates a functional block diagram of the apparatus 100 according to a modification of the present embodiment. In the present drawing, components having the same function and configuration as components in FIG. 1 are given the same reference numerals, and the description below includes only differing points. The apparatus 100 according to the present modification further includes a coordinate acquiring section 510 and a region of interest specifying section 520.

The coordinate acquiring section 510 acquires at least one coordinate in the input image. The coordinate acquiring section 510 supplies the region of interest specifying section 520 with the at least one acquired coordinate. Here, the coordinate acquiring section 510 may acquire the coordinate of only a single point in the input image or may acquire a set of a plurality of coordinates in the input image.

The region of interest specifying section 520 specifies the region of interest according to the, at least one, coordinate supplied from the coordinate acquiring section 510. Here, the region of interest specifying section 520 may specify a predetermined range, using the at least one coordinate as a reference, as the region of interest. Instead of or in addition to this, the region of interest specifying section 520 may specify a range having a texture that is similar to the texture at the, at least one, coordinate as the region of interest. Instead of, or in addition to this, the region of interest specifying section 520 may specify a region surrounded by a set of a plurality of coordinates as the region of interest. The region of interest specifying section 520 supplies the annotated image acquiring section 120 with information concerning the specified region of interest. The annotated image acquiring section 120 retrieve the annotated image in accordance with the region of interest specified by the region of interest specifying section 520.

Figure 6:
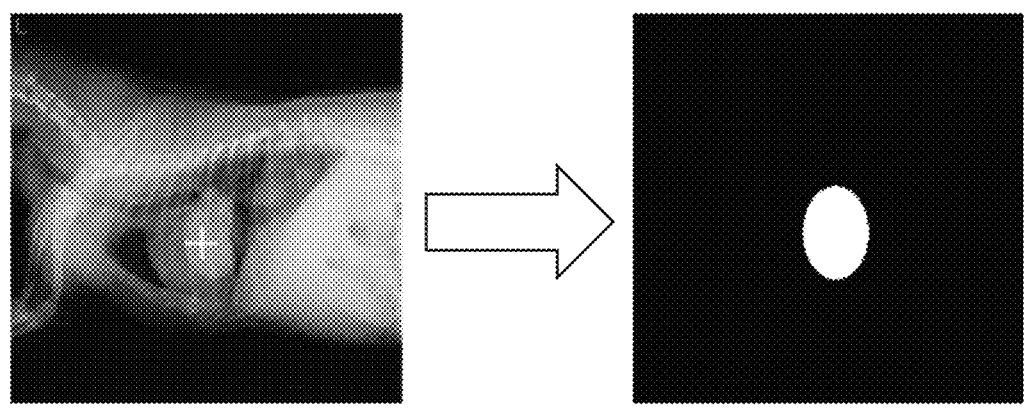
FIG. 6 shows an example of the specification of a region of interest by the apparatus 100 according to the present modification.

FIG. 6 shows an example of the specification of a region of interest by the apparatus 100 according to the present modification. For example, the apparatus 100 displays an input image in a screen, and receives input caused by manipulation by a user (for example, but not being limited to, a physician, a veterinarian, a laboratory technician, or a student). The coordinate acquiring section 510, based on the user input, retrieves at least one coordinate in the input image, e.g. the coordinate at the location indicated by the cross mark as shown in the left image of the present drawing. The region of interest specifying section 520 then specifies the region of interest to be a predetermined range with, the at least one, coordinate as a reference, e.g. the range (region shown in white in the drawing) shaped as an ellipse with a predetermined size centered on the coordinate at the location indicated by the cross mark such as shown in the right image in the present drawing.

However, the method for specifying the region of interest is not limited to this. As described above, the region of interest specifying section 520 may specify a range having a texture similar to the texture at the location indicated by the cross mark, for example, as the region of interest. As another example, a user may perform a manipulation such as surrounding a partial region in an input image using a mouse manipulation or the like, and the coordinate acquiring section 510 may acquire a set of a plurality of coordinates surrounding this region. The region of interest specifying section 520 may then specify the region surrounded by this set of the plurality of coordinates as the region of interest. Furthermore, the region of interest specifying section 520 may use a combination of the plurality of specification methods described above. In other words, the region of interest specifying section 520 may specify a range having a texture similar to the texture of at least one coordinate, within a predetermined range using at least one coordinate as a reference, as the region of interest. Alternatively, the region of interest specifying section 520 may specify a range including a similar texture within a region surrounded by a set of a plurality of coordinates as the region of interest.

In this way, the apparatus 100 according to the present modification roughly specifies the region of interest by having the user input at least one coordinate in the input image. Then, according to the apparatus 100 of the present modification, even when the annotated image in accordance with the region of interest roughly specified in this manner, i.e. an annotated image containing an error, is acquired, the correct label classification is learned from the labels containing errors, and therefore it is possible to accurately learn the detection model 130 for detecting the target region.

Figure 7:
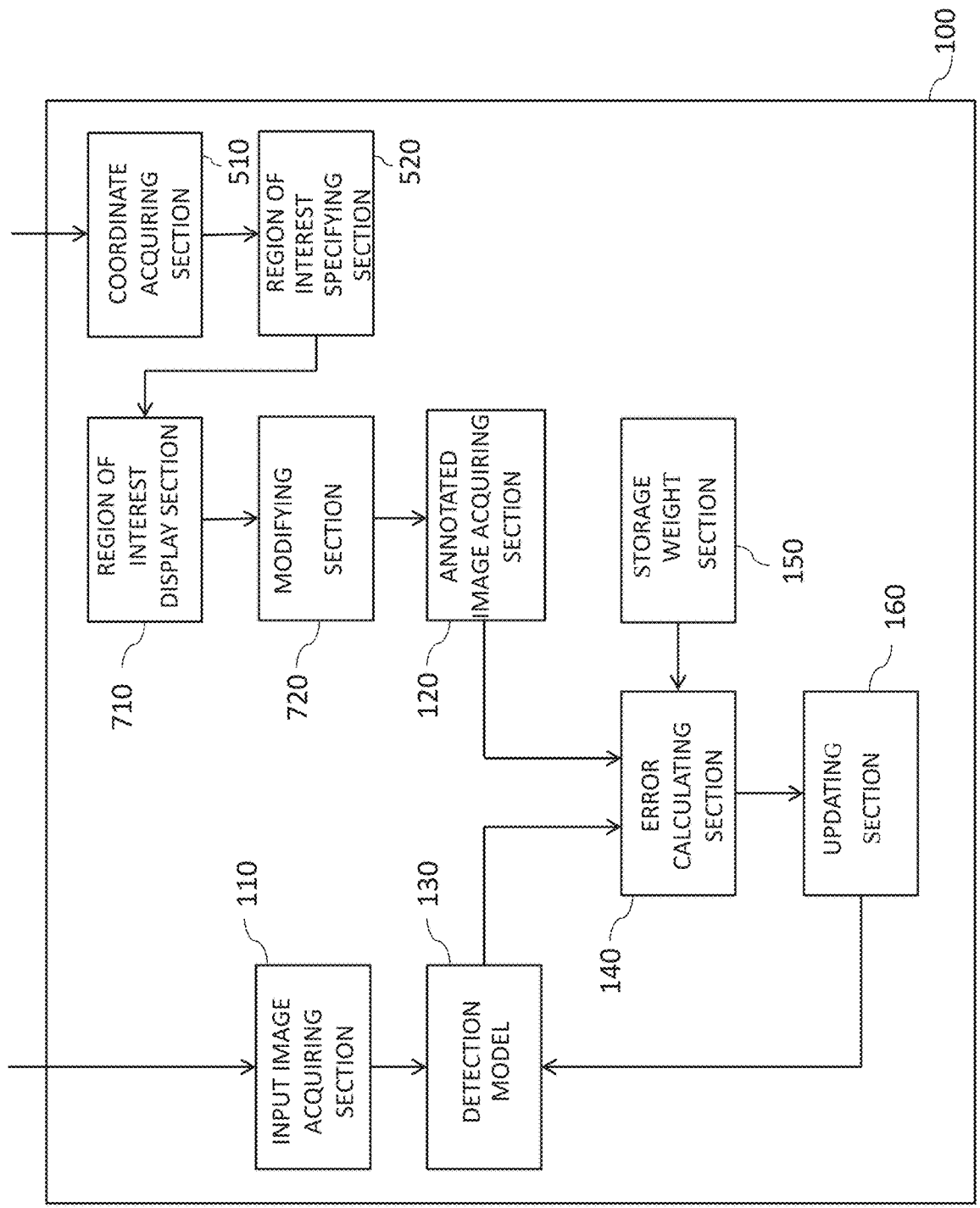
FIG. 7 illustrates a functional block diagram illustrating a computing environment, which, yet another modification to the system for learning a detection model utilizing a loss function, in accordance with at least one embodiment of the present invention.

FIG. 7 shows an exemplary block diagram of the apparatus 100 according to another modification of the present embodiment. In the present drawing, components having the same function and configuration as components in FIG. 5 are given the same reference numerals, and the description below includes only differing points. The apparatus 100 according to the present modification further includes a region of interest display section 710 and a modifying section 720.

The region of interest display section 710 displays the region of interest specified by the region of interest specifying section 520 in a monitor or the like, for example.

The modifying section 720, while the region of interest display section 710 is displaying the region of interest, receives user input and modifies the region of interest specified by the region of interest specifying section 520.

In this way, the apparatus 100 according to the present modification has a function to display the region of interest roughly specified by the region of interest specifying section 520 and to have the user modify this region of interest. In this way, according to the apparatus 100 of the present modification, it is possible to reflect a modification based on the experience of the user in the mechanically specified region of interest, and to acquire an annotated image with less error.

As an example, the embodiments described above can be modified in the following manner. For example, the apparatus 100 includes a plurality of detection models, and retrieves a plurality of annotated images in which the regions of interest for the same input image are set to have different ranges. The apparatus 100 may then learn each of the plurality of detection models using the plurality of annotated images and use a region where the target regions output by each detection model overlap as the target region output by the detection model 130. For example, the apparatus 100 includes two detection models and retrieves, for the same input image, an annotated image in which the region of interest is set to have a relatively wide range and an annotated image in which the region of interest is set to have a relatively narrow range. The apparatus 100 then uses the annotated image in which the region of interest is set to have a relatively wide range to learn one of the detection models, and uses the annotated image in which the region of interest is set to have a relatively narrow range to learn the other detection model. A region predicted as the target region by both of the two detection models may then be used as the target region output by the detection model 130.

As another example, the embodiments described above can be modified in the following manner. For example, if the region of interest specifying section 520 specifies the region of interest according to at least one coordinate, the annotated image acquiring section 120 may set the annotated image corresponding to the at least one coordinate. The above description is an example of a case where the annotated image acquiring section 120 acquires an annotated image in which pixels inside the region of interest are labeled with the class c=1 and the pixels outside the region of interest are labeled with the class c=0. In other words, the annotated image acquiring section 120 acquires an annotated image in which all of the pixels inside the region of interest are labeled with the same class. However, the annotated image acquiring section 120 may acquire an annotated image in which the pixels inside the region of interest are labeled with classes corresponding to the positions of these pixels. In other words, as an example, if the region of interest specifying section 520 has specified a region of interest centered on at least one coordinate, the annotated image acquiring section 120 may acquire an annotated image in which the pixel at the at least one coordinate is labeled with the class c=1, and other pixels are labeled with a class closer to 0 the farther these pixels are from the at least one coordinate. In this way, the apparatus 100 can further enhance the effect of pixels near the position designated by a user, even within the region of interest, to learn the detection model.

Various embodiments of the present invention may be described with reference to flowcharts and block diagrams whose blocks may represent (1) steps of processes in which operations are performed, and (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

Figure 8:
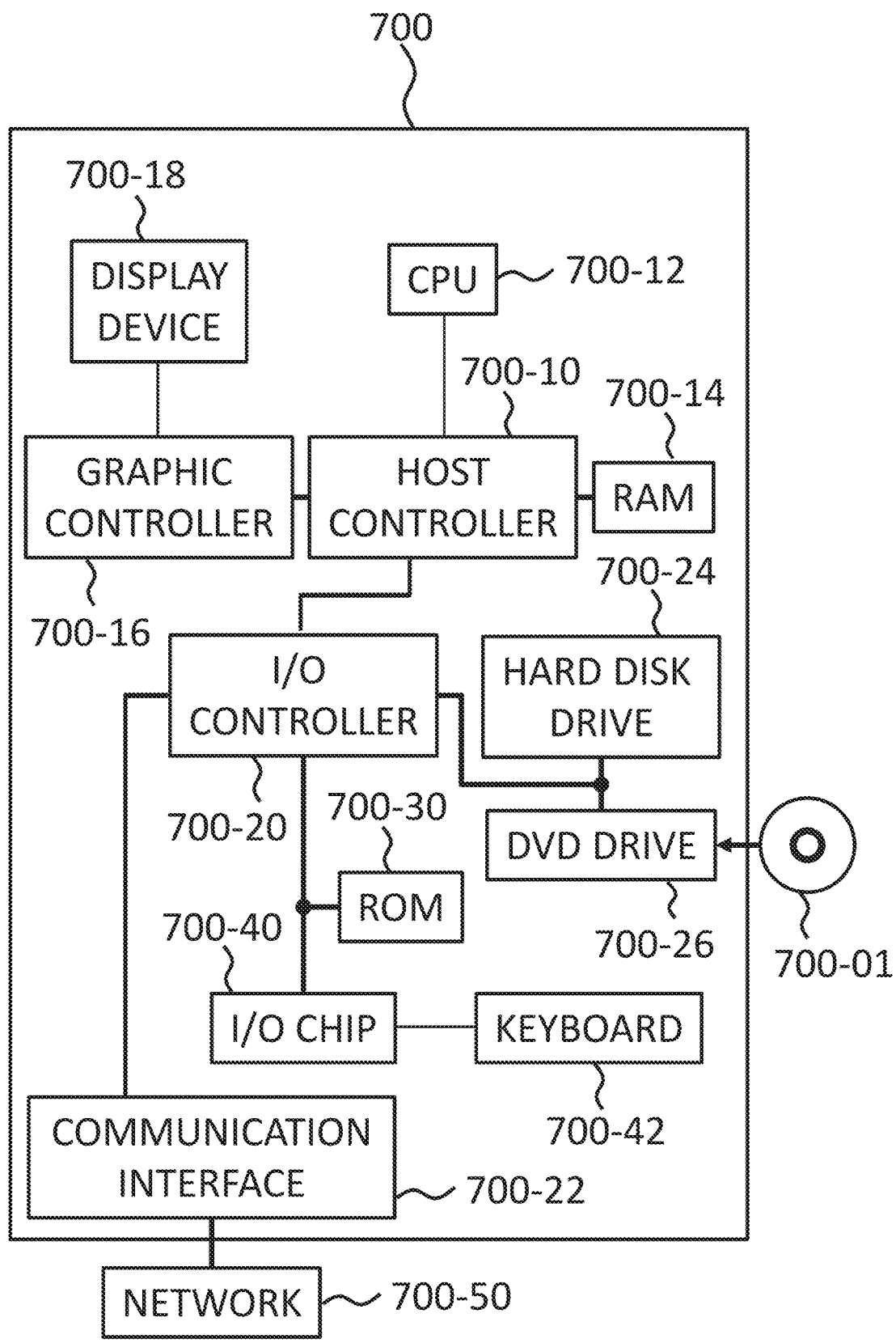
FIG. 8 is a block diagram of components of one or more computing devices within the computing environment depicted in FIG. 1, in accordance with at least on embodiment of the present invention.

FIG. 8 shows an exemplary hardware configuration of a computer configured to perform the foregoing operations, according to an embodiment of the present invention. A program that is installed in the computer 700 can cause the computer 700 to function as or perform operations associated with apparatuses of the embodiments of the present invention or one or more sections (including modules, components, elements, etc.) thereof, and/or cause the computer 700 to perform processes of the embodiments of the present invention or steps thereof. Such a program may be executed by the CPU 700-12 to cause the computer 700 to perform certain operations associated with some or all of the blocks of flowcharts and block diagrams described herein.

The computer 700 according to the present embodiment includes a CPU 700-12, a RAM 700-14, a graphics controller 700-16, and a display device 700-18, which are mutually connected by a host controller 700-10. The computer 700 also includes input/output units such as a communication interface 700-22, a hard disk drive 700-24, a DVD drive 700-26 and an IC card drive, which are connected to the host controller 700-10 via an input/output controller 700-20. The computer also includes legacy input/output units such as a ROM 700-30 and a keyboard 700-42, which are connected to the input/output controller 700-20 through an input/output chip 700-40.

The CPU 700-12 operates according to programs stored in the ROM 700-30 and the RAM 700-14, thereby controlling each unit. The graphics controller 700-16 obtains image data generated by the CPU 700-12 on a frame buffer or the like provided in the RAM 700-14 or in itself and causes the image data to be displayed on the display device 700-18.

The communication interface 700-22 communicates with other electronic devices via a network 700-50. The hard disk drive 700-24 stores programs and data used by the CPU 700-12 within the computer 700. The DVD drive 700-26 reads the programs or the data from the DVD-ROM 700-01 and provides the hard disk drive 700-24 with the programs or the data via the RAM 700-14. The IC card drive reads programs and data from an IC card, and/or writes programs and data into the IC card.

The ROM 700-30 stores therein a boot program or the like executed by the computer 700 at the time of activation, and/or a program depending on the hardware of the computer 700. The input/output chip 700-40 may also connect various input/output units via a parallel port, a serial port, a keyboard port, a mouse port, and the like to the input/output controller 700-20.

A program is provided by computer readable media such as the DVD-ROM 700-01 or the IC card. The program is read from the computer readable media, installed into the hard disk drive 700-24, RAM 700-14, or ROM 700-30, which are also examples of computer readable media, and executed by the CPU 700-12. The information processing described in these programs is read into the computer 700, resulting in cooperation between a program and the above-mentioned various types of hardware resources. An apparatus or method may be constituted by realizing the operation or processing of information in accordance with the usage of the computer 700-50 to a reception buffering region or the like provide on the recording medium.

For example, when communication is performed between the computer 700 and an external device, the CPU 700-12 may execute a communication program loaded onto the RAM 700-14 to instruct communication processing to the communication interface 700-22, based on the processing described in the communication program. The communication interface 700-22, under control of the CPU 700-12, reads transmission data stored on a transmission buffering region provided in a recording medium such as the RAM 700-14, the hard disk drive 700-24, the DVD-ROM 700-01, or the IC card, and transmits the read transmission data to network 700-50 or writes reception data received from network 700-50 to a reception buffering region or the like provided on the recording medium.

In addition, the CPU 700-12 may cause all or a necessary portion of a file or a database to be read into the RAM 700-14, the file or the database having been stored in an external recording medium such as the hard disk drive 700-24, the DVD-drive 700-26 (DVD-ROM 700-01), the IC card, etc., and perform various types of processing on the data on the RAM 700-14. The CPU 700-12 may then write back the processed data to the external recording medium.

Various types of information, such as various types of programs, data, tables, and databases, may be stored in the recording medium to undergo information processing. The CPU 700-12 may perform various types of processing on the data read from the RAM 700-14, which includes various types of operations, processing of information, condition judging, conditional branch, unconditional branch, search/replace of information, etc., as described throughout this disclosure and designated by an instruction sequence of programs, and writes the result back to the RAM 700-14. In addition, the CPU 700-12 may search for information in a file, a database, etc., in the recording medium. For example, when a plurality of entries, each having an attribute value of a first attribute is associated with an attribute value of a second attribute, are stored in the recording medium, the CPU 700-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 700. In addition, a recording medium such as a hard disk or a RAM provided in a server system connected to a dedicated communication network or the Internet can be used as the computer readable media, thereby providing the program to the computer 700 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An apparatus comprising:
a processor or a programmable circuitry; and
one or more computer readable mediums collectively including instructions that, in response to being executed by the processor or the programmable circuitry, cause the processor or the programmable circuitry to:
acquire an input image;
acquire an annotated image designating a region of interest in the input image, wherein pixels of the annotated image are labelled with respective values of a class associated with the region of interest;
input the input image to a detection model that generates an output image showing a target region from the input image, wherein pixels of the output image are labelled with respective values of the class based on the target region;
calculate an error between the output image and the annotated image, using a weighted cross entropy loss function that includes multiplying a value of a label of a pixel of the annotated image by a logarithm of a value of a label of a corresponding pixel of the output image, and applying a weight associated with the class; and
update the detection model in a manner to reduce the error.

2. The apparatus of claim 1, wherein the detection model includes, between an input and an output, one or a plurality of convolution layers, one or a plurality of pooling layers, one or a plurality of deconvolution layers, and one or a plurality of batch normalization layers.

3. The apparatus of claim 2, wherein the plurality of batch normalization layers is arranged respectively every predetermined number of layers in at least one of a first path including some of the plurality of convolution layers and the plurality of pooling layers and a second path including the rest of the plurality of convolution layers and the plurality of deconvolution layers.

4. The apparatus of claim 1, the instructions further causing the processor or the programmable circuitry to:
acquire at least one coordinate in the input image; and
specify the region of interest according to the at least one coordinate.

5. The apparatus of claim 1, wherein the weighted cross entropy loss function is shown by a following expression, in which X is a collection of all pixels i in the input image, C is a collection of all classes c, $W_c$ is a weight of the class c, $p_i^c$ is a value of the class c at the pixel i in the annotated image, and $q_i^c$ is the value of the class c at the pixel i in the output image;

$$\mathcal{L} = \sum_{i \in X} \sum_{c \in C} w_c p_i^c \log q_i^c. \qquad \text{expression 1}$$

6. A computer program product including one or more computer readable storage media collectively storing program instructions that are executable by a processor or programmable circuitry to cause the processor or the programmable circuitry to perform operations comprising:

acquiring an input image;

acquiring an annotated image designating a region of interest in the input image, wherein pixels of the annotated image are labelled with respective values of a class associated with the region of interest;

inputting the input image to a detection model that generates an output image showing a target region from the input image, wherein pixels of the output image are labelled with respective values of the class based on the target region;

calculating an error between the output image and the annotated image, using a weighted cross entropy loss function that includes multiplying a value of a label of a pixel of the annotated image by a logarithm of a value of a label of a corresponding pixel of the output image, and applying a weight associated with the class; and updating the detection model in a manner to reduce the error.

7. The computer program product of claim 6, wherein the detection model includes, between an input and an output, one or a plurality of convolution layers, one or a plurality of pooling layers, one or a plurality of deconvolution layers, and one or a plurality of batch normalization layers.

8. The computer program product of claim 7, wherein the plurality of batch normalization layers is arranged respectively every predetermined number of layers in at least one of a first path including some of the plurality of convolution layers and the plurality of pooling layers and a second path including the rest of the plurality of convolution layers and the plurality of deconvolution layers.

9. The computer program product of claim 6, the operations further comprising:

acquiring at least one coordinate in the input image; and specifying the region of interest according to the at least one coordinate.

10. The computer program product of claim 6, wherein the weighted cross entropy loss function is shown by a following expression, in which X is a collection of all pixels i in the input image, C is a collection of all classes c, $W_c$ is a weight of the class c, $p_i^c$ is a value of the class c at the pixel i in the annotated image, and $q_i^c$ is the value of the class c at the pixel i in the output image;

$$\mathcal{L} = \sum_{i \in X} \sum_{c \in C} w_c p_i^c \log q_i^c. \qquad \text{expression 1}$$

11. A computer program product including one or more computer readable storage media collectively storing program instructions that are executable by a processor or programmable circuitry to cause the processor or the programmable circuitry to perform operations comprising:

acquiring an input image and an indication of at least one coordinate in the input image;

specifying a predetermined range of the input image as a region of interest in the input image, resulting in an annotated image, using the at least one coordinate as a reference;

inputting the input image to a detection model that generates an output image showing a target region from the input image;

calculating an error between the output image and the annotated image, using a weighted loss function that weights an error inside the region of interest more heavily than an error outside the region of interest; and updating the detection model in a manner to reduce the error between the output image and the annotated image.

12. The computer program product of claim 11, wherein the weighted cross entropy loss function is shown by a following expression, in which X is a collection of all pixels i in the input image, C is a collection of all classes c, $W_c$ is a weight of the class c, $p_i^c$ is a value of the class c at the pixel i in the annotated image, and $q_i^c$ is the value of the class c at the pixel i in the output image;

$$\mathcal{L} = \sum_{i \in X} \sum_{c \in C} w_c p_i^c \log q_i^c. \qquad \text{expression 1}$$

13. The computer program product of claim 11, wherein the detection model includes, between an input and an output, one or a plurality of convolution layers, one or a plurality of pooling layers, one or a plurality of deconvolution layers, and one or a plurality of batch normalization layers.

14. The computer program product of claim 13, wherein the plurality of batch normalization layers is arranged respectively every predetermined number of layers in at least one of a first path including some of the plurality of convolution layers and the plurality of pooling layers and a second path including the rest of the plurality of convolution layers and the plurality of deconvolution layers.

15. A computer program product including one or more computer readable storage media collectively storing program instructions that are executable by a processor or programmable circuitry to cause the processor or the programmable circuitry to perform operations comprising:

acquiring an input image and an indication of at least one coordinate in the input image;

specifying a region of interest in the input image, resulting in an annotated image, the region of interest having a texture similar to a texture of the at least one coordinate;

inputting the input image to a detection model that generates an output image showing a target region from the input image;

calculating an error between the output image and the annotated image, using a weighted loss function that weights an error inside the region of interest more heavily than an error outside the region of interest; and updating the detection model in a manner to reduce the error between the output image and the annotated image.

16. The computer program product of claim 15, wherein the weighted cross entropy loss function is shown by a following expression, in which X is a collection of all pixels i in the input image, C is a collection of all classes c, $W_c$ is a weight of the class c, $p_i^c$ is a value of the class c at the pixel i in the annotated image, and $q_i^c$ is the value of the class c at the pixel i in the output image;

$$\mathcal{L} = \sum_{i \in X} \sum_{c \in C} w_c p_i^c \log q_i^c. \qquad \text{expression 1}$$

17. The computer program product of claim 15, wherein the detection model includes, between an input and an output, one or a plurality of convolution layers, one or a plurality of pooling layers, one or a plurality of deconvolution layers, and one or a plurality of batch normalization layers.

18. The computer program product of claim 17, wherein the plurality of batch normalization layers is arranged respectively every predetermined number of layers in at least one of a first path including some of the plurality of convolution layers and the plurality of pooling layers and a second path including the rest of the plurality of convolution layers and the plurality of deconvolution layers.

19. A computer program product including one or more computer readable storage media collectively storing program instructions that are executable by a processor or programmable circuitry to cause the processor or the programmable circuitry to perform operations comprising:
  acquiring an input image and an indication of at least one coordinate in the input image;
  specifying a region of interest in the input image according to the at least one coordinate, resulting in an annotated image;
  displaying the region of interest;
  while the region of interest is being displayed, receiving user input and modifying the region of interest;
  inputting the input image to a detection model that generates an output image showing a target region from the input image;
  calculating an error between the output image and the annotated image, using a weighted loss function that weights an error inside the region of interest more heavily than an error outside the region of interest; and
  updating the detection model in a manner to reduce the error between the output image and the annotated image.

20. The computer program product of claim 19, wherein the weighted cross entropy loss function is shown by a following expression, in which X is a collection of all pixels i in the input image, C is a collection of all classes c, $W_c$ is a weight of the class c, $p_i^c$ is a value of the class c at the pixel i in the annotated image, and $q_i^c$ is the value of the class c at the pixel i in the output image;

$$\mathcal{L} = \sum_{i \in X} \sum_{c \in C} w_c p_i^c \log q_i^c. \qquad \text{expression 1}$$

21. The computer program product of claim 19, wherein the detection model includes, between an input and an output, one or a plurality of convolution layers, one or a plurality of pooling layers, one or a plurality of deconvolution layers, and one or a plurality of batch normalization layers.

22. The computer program product of claim 21, wherein the plurality of batch normalization layers is arranged respectively every predetermined number of layers in at least one of a first path including some of the plurality of convolution layers and the plurality of pooling layers and a second path including the rest of the plurality of convolution layers and the plurality of deconvolution layers.

\* \* \* \* \*